Oct. 16, 1951     J. HALLER     2,571,868

COMPOSITE POWDERED METAL BEARING

Filed March 20, 1950     2 SHEETS—SHEET 1

Inventor
John Haller
By Carthel + Bugbee
Attorneys

Oct. 16, 1951  J. HALLER  2,571,868
COMPOSITE POWDERED METAL BEARING
Filed March 20, 1950  2 SHEETS—SHEET 2
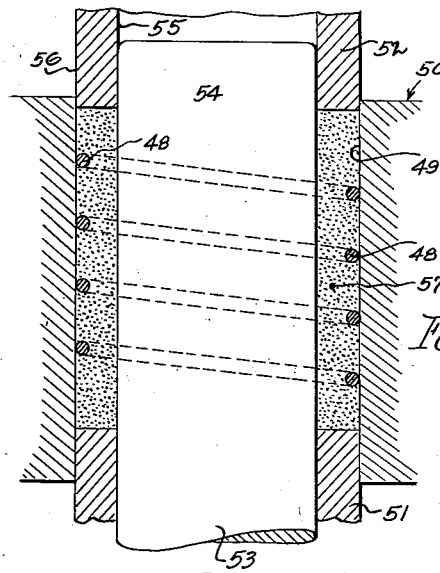
Fig. 9.
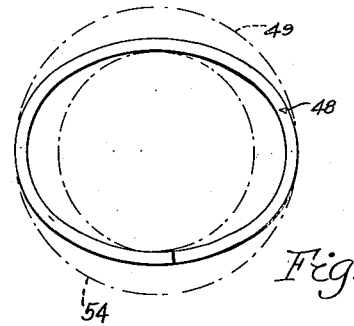
Fig. 13.
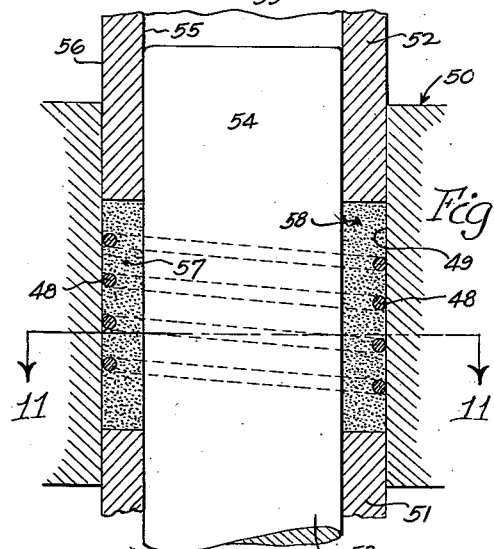
Fig. 10.
Fig. 12.
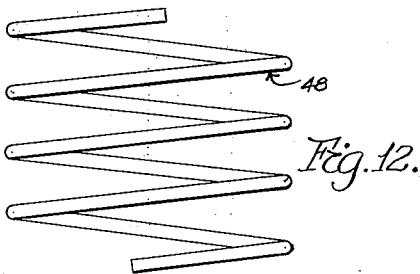
Fig. 14.
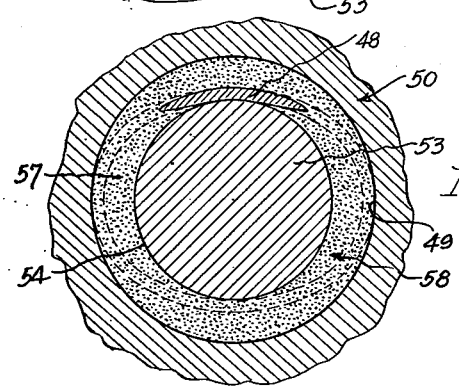
Fig. 11.
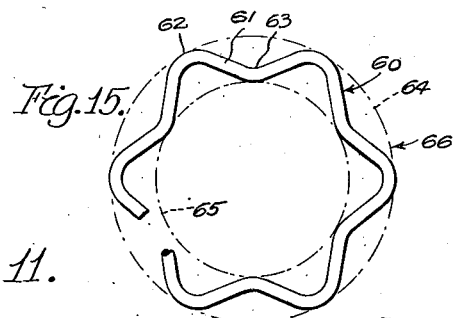
Fig. 15.
Inventor
John Haller
Barthel & Bugbee
Attorneys Patented Oct. 16, 1951

2,571,868

UNITED STATES PATENT OFFICE 2,571,868

COMPOSITE POWDERED METAL BEARING

John Haller, Northville, Mich.

Application March 20, 1950, Serial No. 150,660

10 Claims. (Cl. 308—121)

This invention relates to bearings and, in particular, to powdered metal bearings.

One object of this invention is to provide a composite powdered metal oil well bearing which will possess the combined advantages of a powdered iron sleeve bearing with a bronze sleeve bearing preferably of powdered bronze, wherein the powdered iron sleeve has an oil well in the interior thereof and the bronze sleeve bearing has oil holes leading through its wall to the inner surface of the powdered iron bearing so as to receive and transmit oil therefrom.

Another object is to provide a composite powdered metal oil well bearing which will possess the inexpensive construction and material of powdered iron for the major portion of the bearing and the superior load-carrying qualities of a bronze bearing produced by a thin bronze sleeve, either solid bronze or powdered bronze, secured in the powdered iron sleeve.

Another object is to provide a composite powdered metal oil well bearing of the foregoing character and a process of making such a bearing, wherein the oil holes in the powdered bronze inner sleeve or bearing sleeve are disposed in directions intermediate the tangential and radial directions through the wall of the sleeve in such a manner as to carry the oil in a roughly chordal path from the outer to the inner surface of the bearing.

In the drawings:

Figure 9 is a central vertical section through the die cavity of a powdered metal molding press at the start of molding the inner bearing sleeve used in the composite powdered metal bearing of Figure 8;

Figure 10 is a view similar to Figure 9, but showing the position of the parts at the conclusion of molding;

Figure 11 is a horizontal section taken along the line 11—11 in Figure 10;

Figure 12 is a side elevation of the infiltratable core used in molding the powdered metal bearing sleeve shown in Figures 9 and 10;

Figure 13 is a top plan view of the infiltratable core shown in Figure 12;

Figure 14 is a side elevation, partly in central vertical section, of the finished powdered metal bearing sleeve produced in the molding operations of Figures 9 to 11 inclusive and used in the composite powdered metal oil well bearing of Figure 8; and Figure 15 is a top plan view of a modified infiltratable core for the same purpose as that shown in Figures 12 and 13.

Powdered metal oil well bearings of the types shown in my co-pending applications Serial No. 81,274 filed March 14, 1949 for Porous Bearing With Lubricant Reservoir Therein, and Serial No. 119,537 filed October 4, 1949 for Powdered Metal Article, and in the application of Leland C. Blood Serial No. 82,243 filed March 18, 1949 for Porous Chambered Bearing and Process of Making the Same and the application of Arthur L. Causley Serial No. 87,975 filed April 16, 1949 for Fluid-Permeable Article and Process of Making the Same, have been expensive to manufacture if made of powdered bronze, because of the high cost of materials, although possessing superior load-carrying characteristics. Powdered iron oil well bearings, on the other hand, while less expensive to manufacture, due to the lower cost of materials, are inferior in load-carrying characteristics to powdered bronze bearings. The present invention provides a composite powdered metal bearing having the outer oil well bearing portion constituting the major portion of the bulk and weight of the bearing composed of relatively inexpensive powdered iron, and the inner or load carrying portion of the bearing consisting of a thin sleeve composed of powdered bronze swedged or otherwise immovably secured within the powdered iron oil well bearing portion. The wall of the bronze sleeve, which may optionally be of solid bronze rather than powdered bronze, is provided with oil holes to more readily convey the oil from the powdered iron oil well portion to the load-carrying surface. These oil holes may be radial, or in a modification, roughly chordal.

Figure 5:
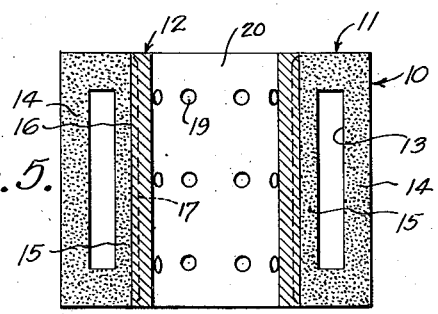
Figure 5 is a central vertical section of the finished composite bearing after the bronze bearing sleeve shown in Figure 3 has been swedged into interlocking engagement with the outer oil well sleeve.
Figure 6:
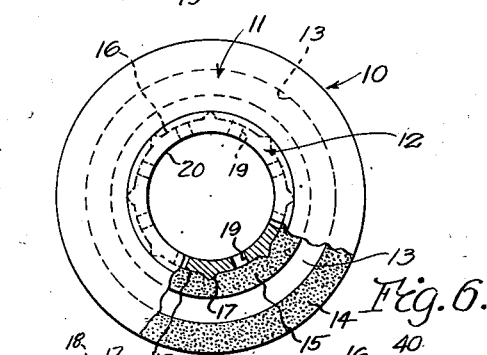
Figure 6 is a top plan view of the composite bearing shown in Figure 5, partly in horizontal section.

Referring to the drawings in detail, Figures 5 and 6 show a composite powdered metal oil well bearing, generally designated 10, consisting generally of two portions, namely an outer powdered iron oil well sleeve 11 and a solid or powdered bronze inner bearing sleeve 12. The outer powdered iron oil well sleeve 11 consists of a hollow powdered iron cylinder having a preferably annular oil well 13 arranged between its outer and inner wall portions 14 and 15 respectively. The outer oil well sleeve 11 has a central bore 16 with circumferentially spaced recesses 17 and flared opposite ends 18.

The outer oil well sleeve 11 is made according to the process disclosed and claimed in my co-pending applications Serial No. 70,056 filed January 10, 1949 for Powdered Metal Article and Process of Making the Same, and Serial No. 81,274 filed March 14, 1949 for Porous Bearing With Lubricant Reservoir Therein. Briefly stated, this consists of forming a core of infiltratable material having the shape desired for the oil well 13—for example, a ring of copper-zinc alloy composed of approximately 85% copper and 15% zinc—inserted in the mold cavity of a powdered metal molding press, such as that shown diagrammatically in Figures 9 to 11 herein, surrounded by powdered iron particles and pressed into a semi-finished bearing. This "green" powdered iron bearing containing the copper-zinc alloy insert is then placed in a sintering oven and sintered at a temperature of approximately 2020° F., whereupon the infiltratable metal of the core melts and enters into the pores of the powdered iron sleeve, strengthening the sleeve and leaving a void or oil well 13 in the space previously occupied by the core or insert. In the same molding operation, the recesses 17 and flared mouths 18 of the bore 16 are also produced by a suitably configured inner plunger in the molding press. The oil well 13 is then filled with oil by boiling it in an oil bath or by inserting it in a hot oil bath in an evacuated container.

The bronze bearing sleeve 12 may be made of a thin walled tube or bushing of bronze or formed of molded sintered bronze powder made by conventional powdered bronze metallurgy processes. It is preferably provided with oil holes 19 through its walls so that the oil can flow freely from the oil well 13 through the pores of the inner wall 15 of the outer sleeve 11 to the inner wall or bore 20 of the bearing sleeve 12. The outer wall 21 thereof (Figures 3 and 4) is preferably made of approximately the same diameter as the bore 16 of the outer sleeve 11, with a sufficient clearance to permit insertion.

Figure 1:
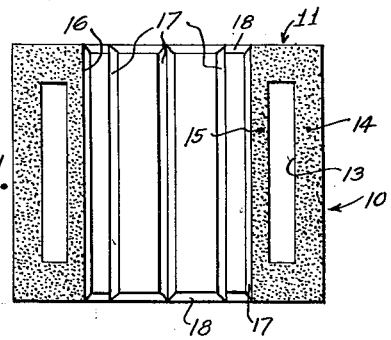
Figure 1 is a central vertical section through the outer powdered iron oil well sleeve forming the outer portion of the composite metal bearing of the present invention.
Figure 2:
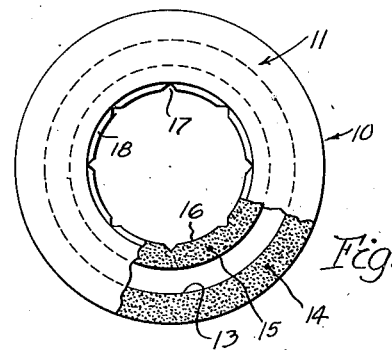
Figure 2 is a top plan view, partly in horizontal section, of the powdered iron outer oil well sleeve of Figure 1.
Figure 3:
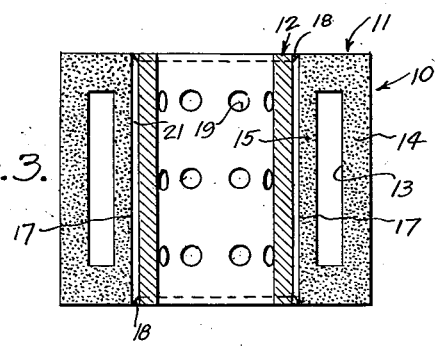
Figure 3 is a central vertical section through the composite powdered metal bearing of the present invention, with the bronze bearing sleeve inserted in the oil well sleeve of Figures 1 and 2, prior to its being swedged into place.
Figure 4:
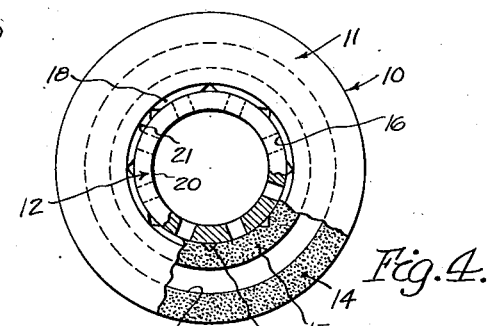
Figure 4 is a top plan view, partly in horizontal section, of the assembly shown in Figure 3.

The sleeve 12 is then inserted into the bore 16 as shown in Figure 3, and is thereafter swedged to force it outward radially so that the material of the bronze sleeve 12 enters the recesses 17 and the flared portions 18, locking the inner sleeve 12 immovably to the outer sleeve 11. At the same time, due to the swedging operation, the grain structure of the bronze sleeve 12 is made finer insofar as its pores are concerened, its bore 20 is necessarily enlarged, and the oil holes 19 are as a consequence made smaller in diameter.

The finished composite bearing 10 is shown in Figures 5 and 6.

In the operation of the invention, the shaft or other rotary member journaled in the bearing bore 20 is fed with oil from the oil well 13 by oil seeping through the pores of the inner wall 15 of the outer sleeve 11 of powdered iron and passing through the oil holes 19 to the bore 20. Thus, even though the swedging procedure closes up the pores of the inner bronze sleeve 12, oil still reaches the bearing bore 20 through the oil holes 19 and the shaft or other rotary member is properly lubricated for the life of the bearing by the oil contained in the oil well 13 without replenishment from any external source of oil. If desired, the oil well 13 may be of the cellular type shown in the co-pending application of Arthur L. Causley, Serial No. 87,975 filed April 16, 1949 for Fluid Permeable Article and Process of Making the Same.

Figure 7:
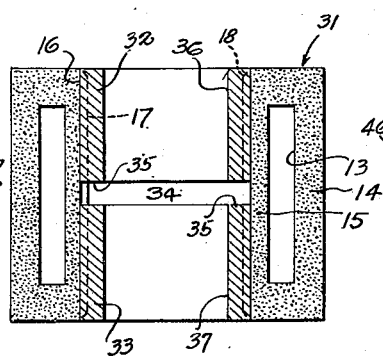
Figure 7 is a central vertical section through a modified composite oil well bearing.

The modified oil well bearing generally designated 30, shown in Figure 7 consists of an outer powdered iron sleeve 31, the same as is shown in Figures 1 to 6 inclusive, provided with longitudinally spaced bronze inner sleeves 32 and 33 separated by an annular gap 34 between the inner ends 35 of the two sleeves 32 and 33. The outer sleeve 31 is of the same configuration and material and constructed in the same manner as the outer sleeve 11 shown in Figures 1 to 6 inclusive, and similar parts are similarly designated. The inner sleeves 32 and 33, however, instead of having oil holes like the oil holes 19 of the inner sleeve 12 of Figures 3 and 5, are provided with lubricating oil for their bores 36 and 37 by oil seeping through the pores of the inner wall 15 of the outer sleeve 31 into the gap 34.

The inner sleeves 32 and 33 are either formed separately in the manner described above for the inner sleeve 12, of either solid bronze or sintered powdered bronze, or they are formed by spraying the inner bore 16 of the outer sleeve 31 with bronze in a conventional manner known to those skilled in the metal spraying art. In either case, by swedging or by spraying, the sleeves 32 and 33 are immovably interlocked with the recesses and 17 flared end portions 18 of the outer bore 16.

The operation of the composite bearing 30 is substantially the same as that of the composite metal bearing 10 of Figures 5 and 6, except that the oil reaches the bearing bore 36 through the gap 34 between the ends 35 of the inner sleeves 32 and 33, rather than through the oil holes 19 previously mentioned.

Figure 8:
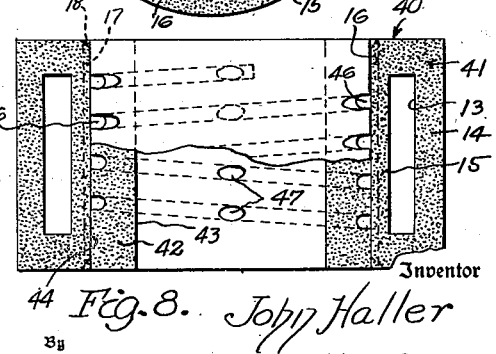
Figure 8 is a central vertical section through a further modified composite oil well bearing.

The modified composite oil well bearing, generally designated 40, shown in Figure 8 employs an outer sleeve, generally designated 41, which is identical with the sleeves 11 and 31 of Figures 5 and 7. The inner or bearing sleeve 42, however, is made of sintered powdered bronze in the manner described below in connection with Figures 8 to 13 inclusive, and is shown individually in Figure 14. The inner sleeve 42 has inner and outer surfaces 43 and 44, the former constituting the bearing bore and the latter fitting into the bore 16, recesses 17 and flared ends 18 of the outer sleeve 41 in the manner described in connection with Figures 1 to 6 inclusive. The bearing sleeve 42, however, is provided with elongated oil holes or passageways 45 (Figure 14) which have outer ports 46 communicating with the outer surface 44 and inner ports 47 communicating with the inner surface or bore 43. These passages or holes 45 are preferably neither radial nor tangential but intermediate the two, for example, approximately chordal, as shown in Figure 11. By analogy, the oil passages 45 might be compared with worm holes in a wooden sleeve because of their circuitous nature. It will be seen from Figure 11, however, that the oil passages 45 might be tangential rather than arcuate because in this manner they could directly interconnect the outer and inner surfaces 44 and 43 without proceeding radially. The circuitous oil passages 45, in addition, can hold a greater amount of oil than the radial passages 19.

The circuitous oil passages 45 are produced in the powdered bronze sleeve 42 in the manner shown in Figures 9 to 13 inclusive. A core 48 of roughly helical form is first prepared, preferably of metallic lead, such as by winding the lead wire around a mandril. The spring-like body 48 thus obtained is withdrawn from the mandril and flattened into an oval (Figure 13) or otherwise having its convolutions distorted such as by distorting alternate convolutions in opposite directions. The thus distorted core 48 is then placed in the mold cavity 49 of a molding press die 50 having lower and upper tubular plungers 51 and 52 and a core rod or central lower plunger 53. The space around the core 48 is then packed with bronze powder, it being made sure that the convolutions of the core 48 touch both the mold cavity bore 49 and the outer surface 54 of the core rod 53. The upper plunger 52 is then brought downward into the mold cavity 59 with its bore 55 telescoping with the core rod 53 and with its outer surface 56 likewise telescoping with the die cavity bore 49. The compression of the powdered bronze particles or charge 57 forces the particles into smaller space as shown in Figure 10, thereby also causing the convolutions of the lead core 48 to be brought closer together. The upper plunger 52 is then retracted and the lower plunger 51 advanced upward, ejecting the semi-finished sleeve, generally designated 58.

The semi-finished or "green" powdered bronze sleeve 58 containing the lead core 48 is now placed in a conventional sintering oven and sintered at a temperature of approximately 1440° F. to 1500° F. for about 15 minutes. During the sintering process, the lead of the core 48 melts and infiltrates into the pores of the charge 57, leaving the circuitous oil passages 45 with their outer and inner ports 46 and 47 respectively (Figure 14), and thereby producing the bronze sleeve 42. This sleeve 42 is then inserted into the outer sleeve 40 in the manner previously described and shown in connection with Figures 1 to 6 inclusive, and swedged into position. In the swedging operation, the material of the sleeve 42 enters the recesses 17 and flared portions 18, as before described, enlarging the inner bore 43 and reducing the diameters of the ports 47 and oil passages 45, in a manner analogous to the reduction in diameter of the oil holes 19 of Figure 5. The operation of the composite oil well bearing 40 is substantially the same as that of the composite oil well bearing 10 of Figures 1 to 6 inclusive.

The modification shown in Figure 15 is a lead core, generally designated 60, with undulations 61 having crests 62 and troughs 63 respectively touching the outer and inner surfaces 64 and 65 of the finished sleeve, generally designated 66. The process and operation are substantially the same as described in connection with the form of the invention shown in Figures 8 to 14 inclusive and hence requires no repetition.

The word "porous" as used herein will be understood to refer only to pores or capillary passages which are sufficiently large to convey a lubricant, and not to microscopic passages which are so tiny as to be incapable of conveying a lubricant and therefore incapable of carrying out the objects or achieving the new results of the present invention as set forth above.

What I claim is:

1. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element.

2. A composite oil well bearing comprising a hollow outer oil well body of porous material having an outer bore therein, said body also having an internal lubricant chamber in the wall thereof communicating with said bore through the pores in said wall, and an inner bearing body of dissimilar porous material to said oil well body secured within said outer bore and having an inner bearing bore therein adapted to rotatably support a rotary machine element.

3. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element, said bearing body having a lubricant hole through the wall thereof extending between said bores.

4. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element, said outer bore having a recess therein, and a portion of said bearing body extending into said recess in interlocking engagement therewith.

5. A composite oil well bearing comprising a hollow outer oil well body of porous material having an outer bore therein, said body also having an internal lubricant chamber in the wall thereof communicating with said bore through the pores in said wall, and a plurality of inner bearing bodies of dissimilar material to said oil well body secured within said outer bore in spaced relationship with a lubricant-conducting gap therebetween.

6. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element, said bearing body having a circuitous chordal lubricant hole through the wall thereof extending between said bores.

7. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element, said bearing body having a circuitous arcuate lubricant hole through the wall thereof extending between said bores.

8. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element, said bearing body having a plurality of approximately arcuate lubricant holes through the wall thereof extending between said bores.

9. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element, said bearing body having a plurality of approximately arcuate lubricant holes through the wall thereof extending between said bores in an approximately helical path.

10. A composite oil well bearing comprising a hollow outer oil well body of porous material having an outer bore therein, said body also having an internal lubricant chamber in the wall thereof communicating with said bore through the pores in said wall, and an inner bearing body of dissimilar material to said oil well body secured within said outer bore and having an inner bearing bore therein adapted to rotatably support a rotary machine element, said bearing body having a plurality of lubricant holes arranged in an approximately undulating path through the wall thereof extending between said bores.

JOHN HALLER.

REFERENCES CITED

The following references are of record in the file of this patent:

UNITED STATES PATENTS

| Number | Name | Date |
|--------|------|------|
| 1,794,623 | Jones | Mar. 3, 1931 |
| 2,014,584 | Peineke | Sept. 17, 1935 |
| 2,145,460 | Ryder | Jan. 31, 1939 |
| 2,187,348 | Hodson | Jan. 16, 1940 |
| 2,252,351 | Paulus | Aug. 12, 1941 |
| 2,270,486 | Willi | Jan. 20, 1942 |